United States Patent
Zerbe et al.

(10) Patent No.: US 8,311,145 B2
(45) Date of Patent: Nov. 13, 2012

(54) BIT-ERROR RATE IN FIXED LINE-RATE SYSTEMS

(75) Inventors: Jared L. Zerbe, Woodside, CA (US); Vladimir M. Stojanovic, Lexington, MA (US)

(73) Assignee: Rambus Inc., Sunnyvale, CA (US)

( * ) Notice: Subject to any disclaimer, the term of this patent is extended or adjusted under 35 U.S.C. 154(b) by 822 days.

(21) Appl. No.: 12/437,530

(22) Filed: May 7, 2009

(65) Prior Publication Data

US 2009/0279637 A1 Nov. 12, 2009

Related U.S. Application Data

(60) Provisional application No. 61/051,639, filed on May 8, 2008.

(51) Int. Cl.
*H04L 27/00* (2006.01)
(52) U.S. Cl. ....... 375/295; 375/346; 375/219; 375/354; 375/358
(58) Field of Classification Search ........... 375/295, 375/346, 219, 354, 358
See application file for complete search history.

(56) References Cited

U.S. PATENT DOCUMENTS

| | | | | |
|---|---|---|---|---|
| 4,422,171 A * | 12/1983 | Wortley et al. | | 714/748 |
| 6,748,220 B1 * | 6/2004 | Chow et al. | | 455/450 |
| 7,373,579 B1 * | 5/2008 | Jones et al. | | 714/748 |
| 7,382,747 B2 * | 6/2008 | Hu et al. | | 370/329 |
| 2002/0031133 A1 * | 3/2002 | McWilliams | | 370/401 |
| 2002/0053062 A1 * | 5/2002 | Szymanski | | 714/801 |
| 2006/0277434 A1 * | 12/2006 | Tsern et al. | | 714/17 |
| 2009/0081971 A1 * | 3/2009 | Rofougaran | | 455/127.1 |
| 2010/0050035 A1 * | 2/2010 | Hong et al. | | 714/748 |

* cited by examiner

*Primary Examiner* — Kenneth Lam
(74) *Attorney, Agent, or Firm* — Morgan, Lewis & Bockius LLP

(57) ABSTRACT

A method of reducing bit-error rate is described. The method includes transmitting a data stream of data words at a line rate that is adjustable and equal to a positive delta value added to an established data rate. The method includes accumulating available time slots in the transmitted data stream, and selectively retransmitting a subset of the data words such that the retransmitted data words occupy no more than the accumulated available time slots.

23 Claims, 9 Drawing Sheets

BIT-ERROR RATE IN FIXED LINE-RATE SYSTEMS

RELATED APPLICATIONS

This application claims priority on U.S. Provisional Application No. 61/051,639, filed May 8, 2008, which is incorporated by reference herein in its entirety.

TECHNICAL FIELD

The subject matter disclosed herein relates generally to circuits for use in integrated circuits, and in particular, to circuits and associated methods and systems having error prediction, error detection, error correction and/or retry modes of operation.

BACKGROUND

Low bit-error rate (BER) data communication over a communication channel is considered an important requirement in many systems. In the case of memory devices and systems, fulfilling this requirement is increasingly difficult due to signaling and circuit limitations. In future memory devices and systems, scaling of interface circuitry to accommodate higher data rates may be restricted by transistor sensitivity and threshold limits. In addition, even when interconnect length and material properties are kept constant, higher data rates may increase the relative impact of inter-symbol interference due to higher losses at increased data rates. Developing circuits with jitter that scales proportionally with the increase in line rate is becoming increasingly difficult. Given constraints on interface overhead and latency, developing faster interfaces with a low BER may become more challenging and expensive.

BRIEF DESCRIPTION OF THE DRAWINGS

For a better understanding, reference should be made to the following detailed description taken in conjunction with the accompanying drawings, in which.

Like reference numerals refer to corresponding parts throughout the drawings.

DESCRIPTION OF EMBODIMENTS

Figure 1:
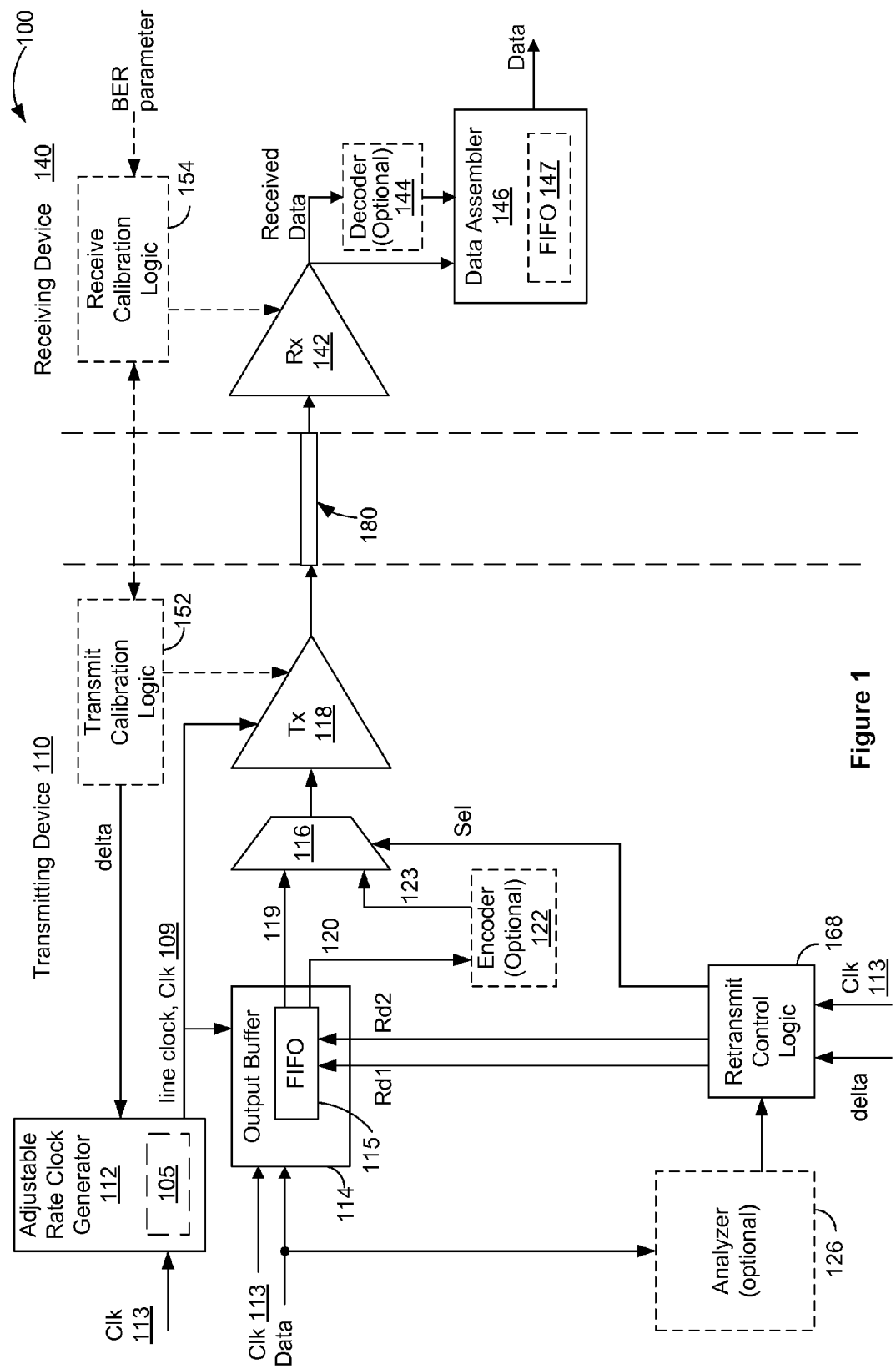
FIG. 1 is a block diagram illustrating a data communication system in accordance with some embodiments.

A method of reducing bit-error rate (BER) is described. As described in more detail below, the method includes transmitting, from a sending device to a receiving device, a data stream that includes data words at a line rate, which is equal to a positive delta value added to an established delivered data rate (a rate at which data is delivered). The method further includes accumulating available time slots in the transmitted data stream at the sending device, and selectively retransmitting a subset of the data words in the data stream to the receiving device, such that the retransmitted data words occupy no more than the accumulated available time slots. In some embodiments, the method includes establishing a data rate "n", or identifying an established data rate, and transmitting the data stream at a line rate of "n+delta". Accordingly, a sending device, e.g., a transmitter, transmits at a line rate slightly higher than the established delivered data rate.

In some embodiments, the number of available time slots corresponds to the product of a difference between the line rate and the established data rate and a time this difference has been allowed to accumulate. In some embodiments, the number of available time slots is a function of a duration of transmission to the receiving device.

In some embodiments, the method may include selectively retransmitting the subset of the plurality of data words at a sequence of times when the accumulated available time slots equal at least a predefined amount. The subset of the plurality of data words comprises one or more data words of the plurality of data words. In some embodiments, the predefined amount is at least the minimum number of time slots required to transmit the one or more data words. In other embodiments, the predefined amount is at least the minimum number of time slots required to transmit the one or more data words and an offset parameter. In some embodiments, the number of accumulated available time slots is equal to at least the predefined amount each time the transmitting operation retransmits a particular number of data words (including any supplemental information, such as offset values, sent along with the data words).

In some embodiments the retransmitted data words include an offset value or other value for identifying the data word or words being retransmitted, and in some embodiments the retransmitted data words include error correction codes, as discussed in more detail below; and the retransmitted data words, including any offset value(s) or other data word identification value(s) and any error correction codes, occupy no more than the accumulated available time slots.

For example, in some embodiments, the retransmitted data words are transmitted between groups of the transmitted data words at fixed intervals. The fixed intervals are a predefined function of the data rate, the line rate, and thus the delta between the data and line rate. Optionally, the method includes inverting, reordering, or scrambling the retransmitted data words relative to the corresponding original transmitted data words in the data stream to lower the probability of reoccurrence of the same error.

The method may further include performing a calibration operation to determine the value of delta. The calibration operation includes determining a BER parameter for each of a plurality of candidate delta values and selecting one of the candidate delta values in accordance with predefined criteria. The calibration operation may be performed multiple times, resulting in a plurality of distinct delta values and distinct BER measurements for the connection. The calibration operation may be performed (A) without using the data retransmission methodology described in this document, or (B) using data retransmission, or (C) both. In some embodiments, a fractional frequency locked loop clocking circuit (e.g., a fractional-N PLL, or a frequency multiplying frequency or phase-locked loop circuitry) is adjusted to adjust the line rate by a plurality of distinct values, each distinct value corresponding to one of the candidate delta values.

In some embodiments, the subset is selected at the sending device independent of the receiving device. For example, the subset may be selected in accordance with BER values associated with the data values of the data words in the selected subset. Alternately, or in addition, the subset is selected in accordance with BER values associated with the data values of the data words in the other non-selected subsets of the plurality of data words. The BERs may be determined based on the data values of (or included in) the one or more data words, or may be associated with historical or predicted BER values when transmitting those data values. The BER values can be associated with either the raw transmission of data values or the transmission inclusive of the retransmission.

In some embodiments, the method further includes storing the transmitted data words in memory for possible retransmission.

A data transmitter is also described. The data transmitter includes a transmitter that transmits a data stream comprising data words at a line rate, which is equal to a positive delta value added to an established data rate. The data transmitter includes retransmit logic coupled to the transmitter. The retransmit logic includes an accumulator that accumulates available time slots in the transmitted data stream. In some embodiments, the available time slots are accumulated at rate corresponding to a difference between the line rate and the established data rate. The transmitter, in conjunction with the retransmit logic, selectively retransmits a subset of the data words such that the retransmitted data words occupy no more than the accumulated available time slots.

Reference will now be made in detail to embodiments, examples of which are illustrated in the accompanying drawings. In the following detailed description, numerous specific details are set forth in order to provide a thorough understanding of the present invention. It will be apparent to one of ordinary skill in the art, however, that the present invention may be practiced without these specific details. In other instances, well-known methods, procedures, components, and circuits have not been described in detail so as not to unnecessarily obscure aspects of the embodiments.

As shown in FIG. 1, a data communication system 100 includes a transmitting device 110, a communication channel or medium 130, and a receiving device 140. Transmitting device 110 transmits data to receiving device 140, via communication channel or medium 130, at a line rate higher than the delivered data rate. The delivered data rate of a communication channel is the number of bits that are conveyed or processed per unit of time and the line rate is the data rate of its raw bitstream traversing the communication channel or medium, including all framing bits and other physical layer overhead. The data includes a plurality of data words. For purposes of explanation, we may assume in this example that each data word is sixty-four (64) bits long, but many other word lengths may be used, including, for example, any suitable lengths between eight (8) and five-hundred-twelve (512) bits. Receiving device 140 includes a receiver 142. In some embodiments, transmitting device 110 includes an adjustable rate clock generator 112, an output buffer 114, a multiplexer 116, a transmitter 118, and retransmit control logic 128. The transmitting device 110 may optionally include an encoder 122, a data analyzer 126, or both. These components or elements of the transmitting device 110 are described below.

The adjustable rate clock generator 112 receives a clock signal 113 with data rate (n) and a value "delta" that is added to the data rate to generate and output a clock signal (Clk) 109 at a line rate equal to:

n+delta.

Delta has a positive value. Conceptually, "delta" may be considered to be a positive, incremental change to a clock rate. In some embodiments, the value of delta is determined by performing a calibration operation when the data communication system 100 is powered on. The calibration operation is discussed below in relation to FIG. 3. In some embodiments, adjustable rate clock generator 112 adjusts a fractional frequency locked loop circuit 105 to allow the fractional frequency locked loop circuit 105 to adjust the line rate of the clock signal Clk 113 to a plurality of distinct values, each distinct value corresponding to a candidate delta value.

As stated above, transmitting device 110 transmits data to receiving device 140 at the line rate (i.e., "n"+delta). The additional time slots created by transmitting data at a line rate greater than the data rate may allow for an improved BER for the data communication system 100. As described below in relation to FIG. 5, the additional time slots (Accumulated Available Time slots, FIG. 5) may be used to retransmit an entire data word when enough available time slots are accumulated.

Figure 2:
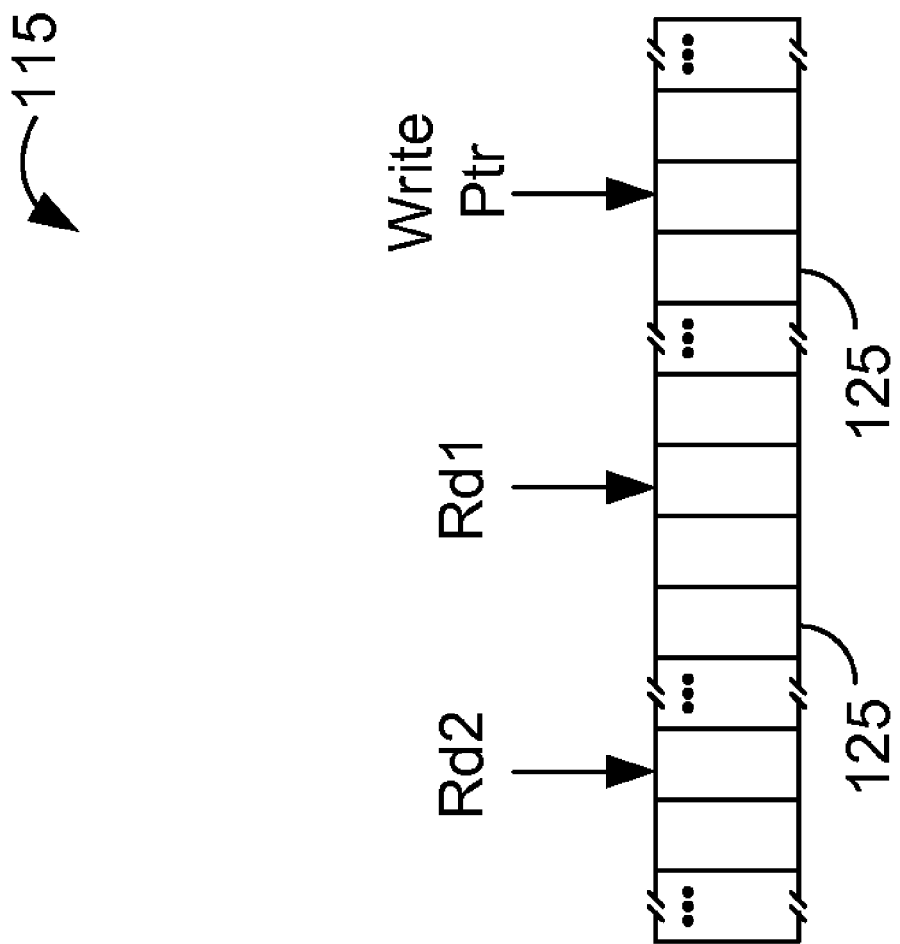
FIG. 2 is a block diagram illustrating a first-in-first-out register in accordance with some embodiments.

Output buffer 114 receives a data input 111 and places individual data words from the data input 111 into a first-in-first-out register (FIFO) 115. In one embodiment, as shown in FIG. 2, FIFO 115 has one write pointer Write Ptr, and two read pointers Rd1 and Rd2, respectively. Read pointers Rd1 and Rd2 are generated by retransmit control logic 128. Rd1 points to the data words to be transmitted, while Rd2 points to the data word(s) to be retransmitted. It may be noted that the output buffer 114 receives two clock signals, Clk 113, which runs at the delivered data rate, and Clk (line clock) 109, which runs at the line rate. The output buffer receives data 111 at the data rate, which is "n", but outputs the data at the higher line rate equal to "n"+delta using line clock 109.

Output buffer 114 outputs two data signals 119 and 120, respectively, to multiplexer 116. Data 119 comprises the data words to be transmitted and retransmission data 120 comprises one or more data word(s) to be retransmitted. Optionally, as shown in FIG. 1, retransmission data signal 120 is routed through encoder 122. Encoder 122 may invert, reorder, scramble or otherwise modify the data words to be retransmitted. In some embodiments, encoder 122 encodes the data words to be retransmitted with error correction codes so that a decoder (e.g., 144) of the receiving device (e.g., 140) can recover the retransmitted data words even if the retransmission of those data words contains errors (so long as the number of errors is within the strength of the error correction codes). Error correction codes may be included in the retransmitted data words with or without inversion, reordering or scrambling of the data words to be retransmitted. Encoder 122 then outputs encoded retransmission data 123 comprising the modified data words to multiplexer 116. In some embodiments, a purpose of encoder 122 is to modify the data words 120 to be retransmitted so as to reduce the error rate or error probability associated with data words to be retransmitted relative to their unencoded transmission. In addition, encoder 122 may optionally be used to attach or supplement the retransmitted data words 120 with an index value that identifies the data word(s) 120 being retransmitted within the sequence of words that were previously transmitted. Alternately, the index value for the retransmitted data may be output by the output buffer 114.

Multiplexer 116 receives two inputs from the output buffer 114: data 119 comprising the set of data words to be transmitted and retransmission data 120 (or optionally, data 123 from encoder 122) comprising the data word(s) to be retransmitted (or a modified version thereof). Multiplexer 116 also receives a selector signal Sel1 produced by retransmit control logic 128. Multiplexer 116 outputs the data words to be transmitted and/or retransmitted by the transmitter 118 to the receiver 142 via the communication channel or medium 130. If the accumulated available time slots are not yet sufficient to retransmit a data word, multiplexer 116 simply outputs the data words received via data signal 119. Once enough available time slots have been accumulated to retransmit one or more data words, multiplexer 116 outputs for retransmission one or more selected data words 120 or 123. During retransmission of selected data words 120 or 123, normal data to be transmitted 119 is accumulated in the output buffer FIFO 115 so that transmit data 119 is not stalled or dropped. A process for "accumulating time slots" is described below with reference to FIG. 5.

It is worth noting that in some embodiments the retransmission of data words after accumulating time slots is independent of whether or not there was an error in transmission. In these embodiments there is always a retransmission of data words; a number of different mechanisms can be used to select which data words are retransmitted.

Figure 4:
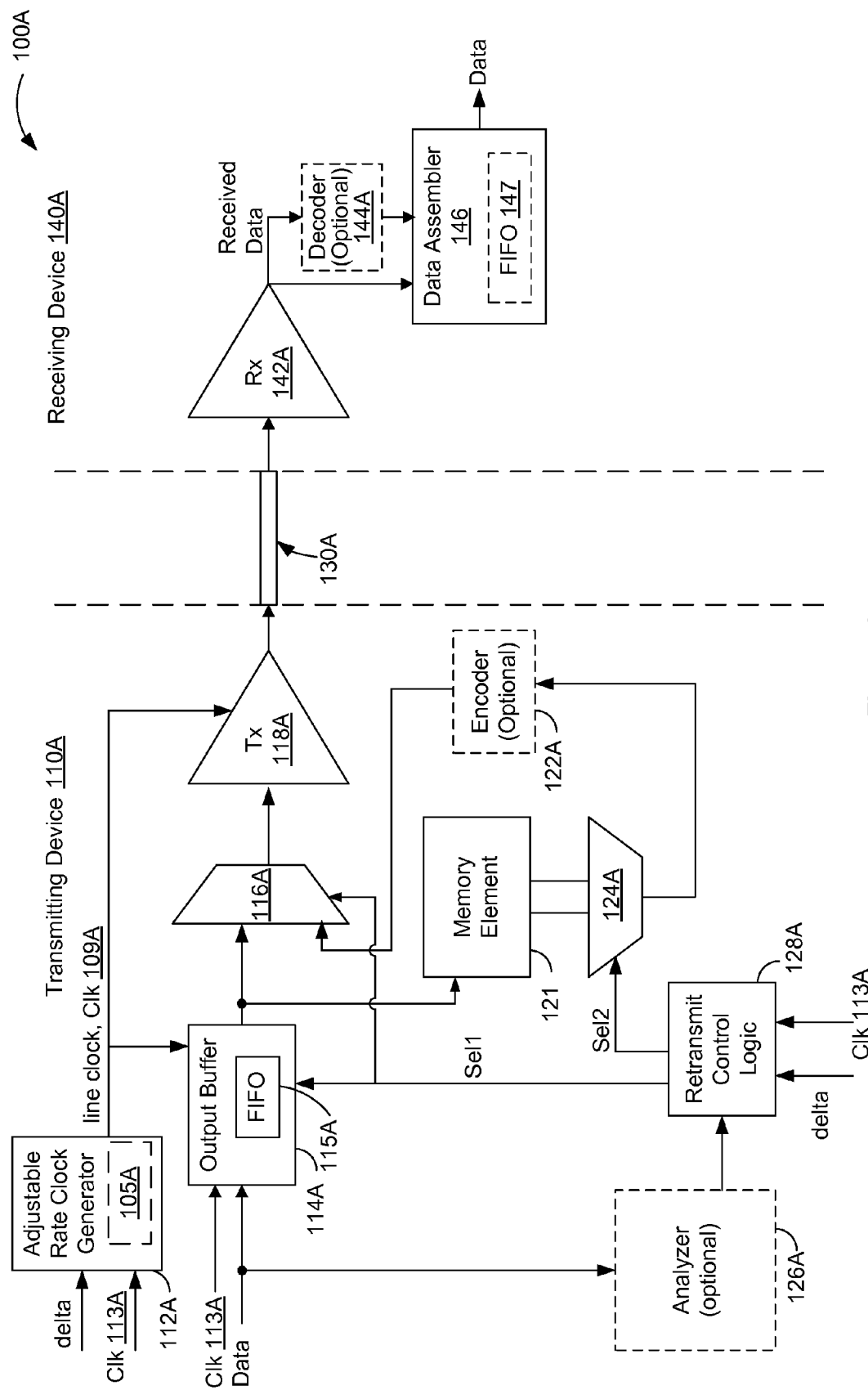
FIG. 4 is a block diagram illustrating a data communication system in accordance with some embodiments.

Retransmit control logic 128 performs time slot accumulation and timing control functions (as discussed with reference to FIGS. 2 and 5). Further, the data word(s) to be retransmitted is (are) determined by the retransmit control logic 128A (FIG. 4), optionally in conjunction with a data analyzer 126A (FIG. 4). The data analyzer 126A operates in the same fashion as data analyzer 126 (FIG. 1).

Retransmit control logic 128 outputs the selector signal Sel1 so that the data word(s) 120 or 123 to be retransmitted are determined by the retransmit control logic 128, optionally in conjunction with the data analyzer 126. In some embodiments, the data word(s) 120 or 123 to be retransmitted include data word(s) that the data analyzer 126 and/or retransmit control logic 128 predict are most likely to have been transmitted incorrectly. In other embodiments, e.g., in data communication system 150 of FIG. 3, the data word(s) 120 or 123 to be retransmitted are requested by the receiving device 140.

In one embodiment, data analyzer 126 measures the frequency sensitivity of each of the data words 111 by applying autocorrelation functions to the data words 111. Because the data pattern of the individual data words can change the frequency spectrum, the frequency content of a data word can often be directly associated with the probability that a particular data word will transmit incorrectly. In this embodiment, the retransmit control logic 128 receives error probability information about each of the data words from the data analyzer 126 and determines which of the set of data words 111 to retransmit. For example, the retransmit control logic 128 may make this determination by selecting the data word having the highest error probability.

In another embodiment, data analyzer 126 searches each of the data words 111 for one or more predefined data patterns that have previously been determined to have high transmission error probabilities. In some embodiments, the predefined data patterns are determined by reviewing historical data transmission errors in the same system 100, or a similar system or can be pre-computed given the system characteristics. In some embodiments, the predefined data patterns are determined by applying autocorrelation functions to candidate data patterns, or by using other error prediction techniques. Furthermore, in some embodiments the predefined data patterns are shorter in length than the data words, while in other embodiments they are the same length or even longer than the data words. In other embodiments, the predefined data patterns have a variety of distinct lengths (i.e., some of the predefined data patterns are longer than others of the predefined data patterns). In addition, in various embodiments the data analyzer 126 is a sub-circuit of the retransmit control logic 128, or the retransmit control logic 128 performs data pattern matching or analysis to select one or more data words for retransmission, thereby subsuming the aforementioned functions of the data analyzer 126.

Once the data word(s) to be retransmitted is (are) determined and the accumulated time slot(s) for retransmission is (are) available, the retransmit control logic 128 outputs Rd2 to FIFO 115. Rd2 causes FIFO 115 to output a retransmit data signal 120, which contains the data word(s) pointed to by Rd2. As stated above, Rd2 points to the data word(s) in FIFO 115 to be retransmitted. As described further with reference to FIG. 5, the data word(s) 120 or 123 to be retransmitted may be transmitted between groups of the transmitted set of data words.

In some embodiments, retransmit control logic 128 outputs the selector signal Sel1 to multiplexer 116 at a sequence of times such that the retransmitted data words occupy one or more retransmit time slots that do not exceed the accumulated time slots. In some embodiments, the selector signal Sel1 is output at a sequence of times when the accumulated time slots are equal to a predefined amount. In some embodiments, the predefined amount is at least the minimum number of available time slots required to retransmit the selected data word. In other embodiments, the predefined amount is at least the minimum number of available time slots required to retransmit the selected data word and an offset parameter. The offset parameter comprises a relative address that identifies the selected data word that is being retransmitted. The offset parameter is described further below with reference to FIG. 5. In some embodiments, the sequence of times occurs each time the same number of data words is transmitted. In other embodiments, the selector signal Sel1 is output at fixed intervals. The fixed intervals may be a predefined function of the line rate and delta.

Received data, received by receiver 142, is processed by a data assembler 146 so that retransmitted data sent by the transmitting device 160 is inserted into the correct position (e.g., indicated by an offset value sent with the retransmitted data) in the received data stream. For example, the data assembler 146 may include a FIFO 147 into which received data is stored, with logic for replacing received data words in the FIFO 147 with retransmitted data words sent by the transmitting device 160. In some embodiments the data assembler 146 may determine the highest probability value for the retransmitted data word by looking at both the original data word and the retransmitted data word and comparing the two received words. In some embodiments, receiving device 140 also optionally includes a decoder 144. Decoder 144 reverses any inversion, reordering, scrambling or other modifications made to the retransmitted data words by encoder 122 of transmitting device 110. Decoder 144 may be coupled to either an input or an output of the data assembler 144, depending on whether the decoder 144 is to reverse modifications made to the retransmitted data before or after the retransmitted data words are inserted into their proper place in the received data stream by the data assembler 146.

As shown in FIG. 2, the FIFO 115 (of output buffer 114, FIG. 1) has one write pointer Write Ptr, two read pointers Rd1 and Rd2, respectively, and a plurality of data blocks 125 of uniform size. Each pointer (Write Ptr, Rd1 and Rd2) points to a data block 125. In FIFO 115, a new data word is inserted into the FIFO 115 in the data block 125 referenced by the write pointer Write Ptr, after which the write pointer Write Ptr is advanced to a next data word (e.g., the next data word to the right in FIG. 2). Thus, the Write Ptr points to the data block 125 in which the next new data word is to be stored. Read pointers Rd1 and Rd2 are generated by retransmit control logic 128 as described above. Rd1 points to the data block 125 containing the data words to be transmitted, while Rd2 points to the data block 125 containing the data word(s) to be retransmitted. Because the offset parameter (discussed above) comprises a relative address that identifies the selected data word that is being retransmitted, the offset parameter is the difference between read pointers Rd1 and Rd2.

Optionally, the distance between Rd1 and Write Ptr may be used to determine when the accumulated available time slots are sufficient to allow retransmission of data. During data transmission (excluding data retransmission) Rd1 advances faster than Write Ptr. During data retransmission, Write Ptr continues to advance, but Rd1 remains unchanged until normal data transmission resumes. As a result, retransmission of data can be triggered whenever the distance between Write Ptr and Rd1 reaches or falls below a threshold level that corresponds to the number of accumulated available time slots being equal to or greater than a predefined value.

While the FIFO 115 is shown as a linear set of data blocks, the FIFO 115 may be implemented as a circular buffer that "never runs out of room" so long as the distance between the write pointer (Write Ptr) and the most distant read pointer (Rd2) never exceeds the number of data blocks in the FIFO 115.

Figure 3:
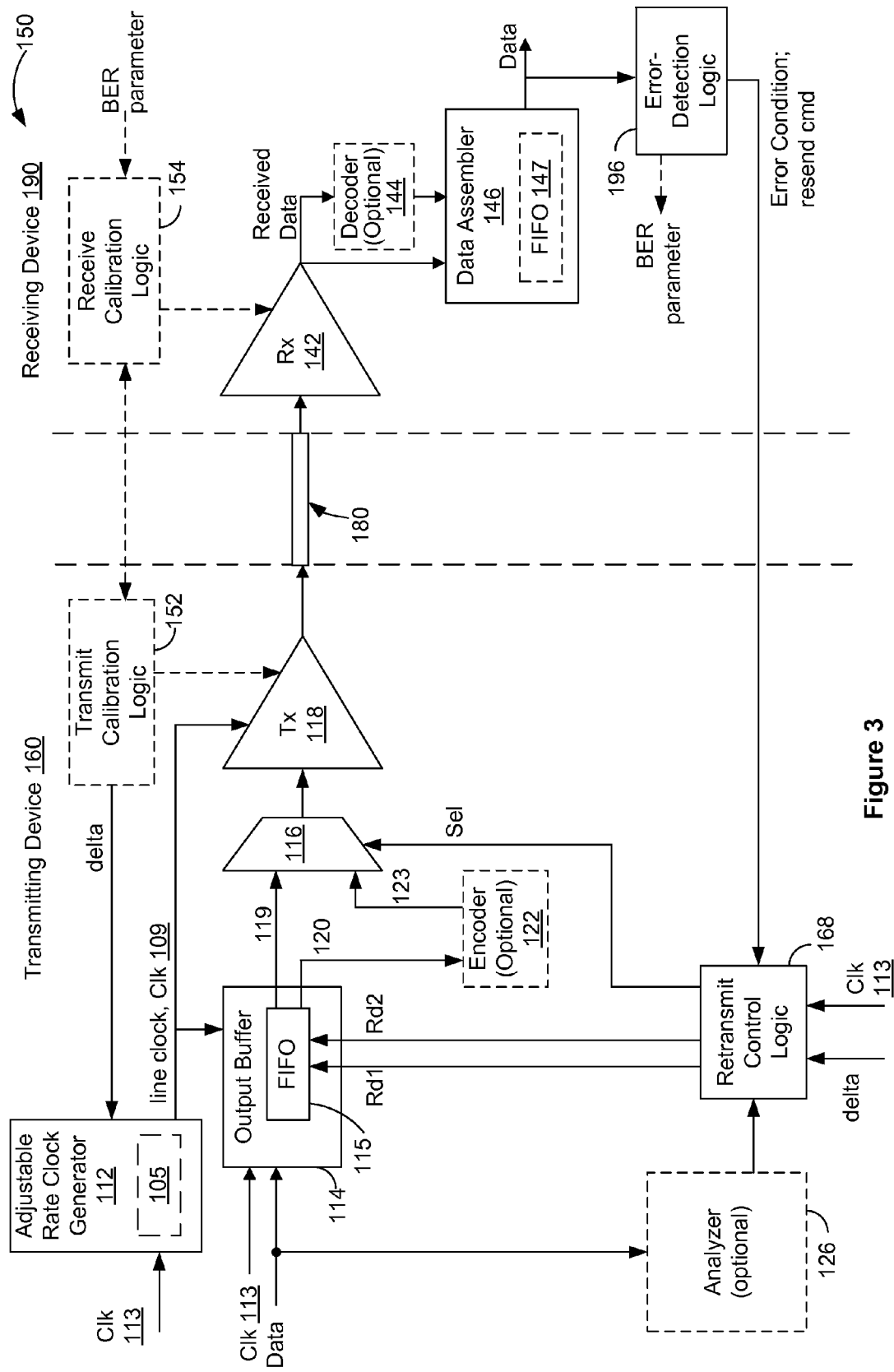
FIG. 3 is a block diagram illustrating a data communication system in accordance with some embodiments.

FIG. 3 illustrates a data communication system 150 including a transmitting device 160 and a receiving device 190. The transmitting device 160 includes some of the same elements, and operates in similar fashion, as the transmitting device 110 of FIG. 1. Specifically, the transmitting device 160 includes an adjustable rate clock generator 112, an output buffer 114, a multiplexer 116, a transmitter 118, and an optional data analyzer 126.

Retransmit control logic 168 performs the time slot accumulation and timing control functions of retransmit control logic 128 (FIG. 1), but is also responsive to an error condition or resend command from error-detection logic 196 of receiving device 190. In some embodiments, transmitting device 160 may also include an encoder 122.

In this embodiment, receiving device 190 includes a receiver 142 and error-detection logic 196. The error detection logic 196 detects when a data word has been transmitted incorrectly and sends the error condition or resend command signal to instruct the retransmit control logic 168 to retransmit the particular data word that has been transmitted incorrectly. The retransmit control logic 168 responds by selecting the identified data word for retransmission and retransmitting that data word the next time sufficient time slots have been accumulated. Error detection logic 196 may use any of a number of well known techniques for detecting errors in received data words, such as parity checking and error detection using error detection codes, or error correction codes or syndromes embedded in the data words.

In some embodiments, after receiving an error condition or resend command from the receiving device 190, retransmit control logic 168 logs the occurrence of the error with respect to the particular data value of the data word and other predefined characteristics. Accordingly, retransmit control logic 168 (or data analyzer 126) may then use the logged historical data to predict when a data word with similar characteristics will be transmitted incorrectly and preemptively retransmit the data word. Accordingly, instead of the word-selection for a particular sequence of words being sent back to transmit device 160, the error log or derivative error information is sent back. In such a manner, receiving device 190 trains transmitting device 160 on the characteristics of data that is more error prone and transmitting device 160 can more readily identify data sequences that are most likely to be transmitted with errors. The data assembler 160 and optional decoder 144 of receiving device 190 are described above with reference to FIG. 1.

In some embodiments, data communication system 100 (FIG. 1) or 150 (FIG. 3) also includes transmit calibration logic 152 and receive calibration logic 154, which determine the value for delta. Receive calibration logic 154 receives a BER parameter from the error detection logic 196. The BER may include one or more of a measured BER, a voltage margin, a measured voltage margin to a measured BER, a timing margin, a measured timing margin to a measured BER, or a predefined combination of these. An example of a technique that may be used to determine the BER parameter is described in U.S. Pat. No. 7,137,048, "Method and apparatus for evaluating and optimizing a signaling system".

Transmit and receive calibration logic 152 and 154, respectively, then select one of the candidate delta values in accordance with one or more predefined criteria. In some embodiments, the predefined criterion includes a desired BER. For example, the predefined criteria may be to select "the candidate delta that is associated with the highest line rate that is (A) no more than 10 percent above the data rate, and (B) which has a BER no higher than $10^{-15}$." In this example, $10^{-15}$ represents a target or worst-case BER, and thus in other embodiments the value $10^{-15}$ can be replaced by any appropriate target or worst-case BER.

In some embodiments, the calibration process may be repeated from time to time (e.g., periodically, or episodically in response to a signal or a detected condition, such as a change in temperature) in order to produce a plurality of delta values.

Transmit calibration logic 152 outputs the selected delta value to adjustable rate clock generator 112 for use in the generation of Clk 109. In some embodiments, adjustable rate clock generator 112 adjusts a fractional frequency locked loop circuit to adjust the line rate of Clk 113 by a plurality of distinct values, each distinct value corresponding to one of the candidate delta values.

FIG. 4 illustrates a data communication system 100A including a transmitting device 110A, a communication channel or medium 130A, and a receiving device 140A. Data communication system 100A is similar to data communication 100 of FIG. 1, except that it includes a memory 121, and its retransmit control logic 128A outputs two selection signals Sel1 and Sel2, instead of a single selection signal Sel1.

Retransmit control logic 128A outputs a selector signal Sel2 to multiplexer 124A at a sequence of times such that the retransmitted data words occupy a retransmit time that does not exceed the accumulated available time slots. In other embodiments, the retransmit control logic 128A outputs Sel2 to multiplexer 124A at a sequence of times such that the accumulated time slots are equal to the time required to retransmit the selected data word.

When multiplexer 124A is triggered by retransmit control logic 128A, the data word(s) to be retransmitted is (are) selected from memory element 121 and output to multiplexer 116A for retransmission through the transmitter 118A. Optional encoder 122A functions in the same way as optional encoder 122 (FIG. 1) described above, but is positioned in the data path between the output of multiplexer 124A and an input of multiplexer 116A. As described below with reference to FIG. 5, the data word(s) to be retransmitted is (are) transmitted between groups of the transmitted set of data words.

Figure 5:
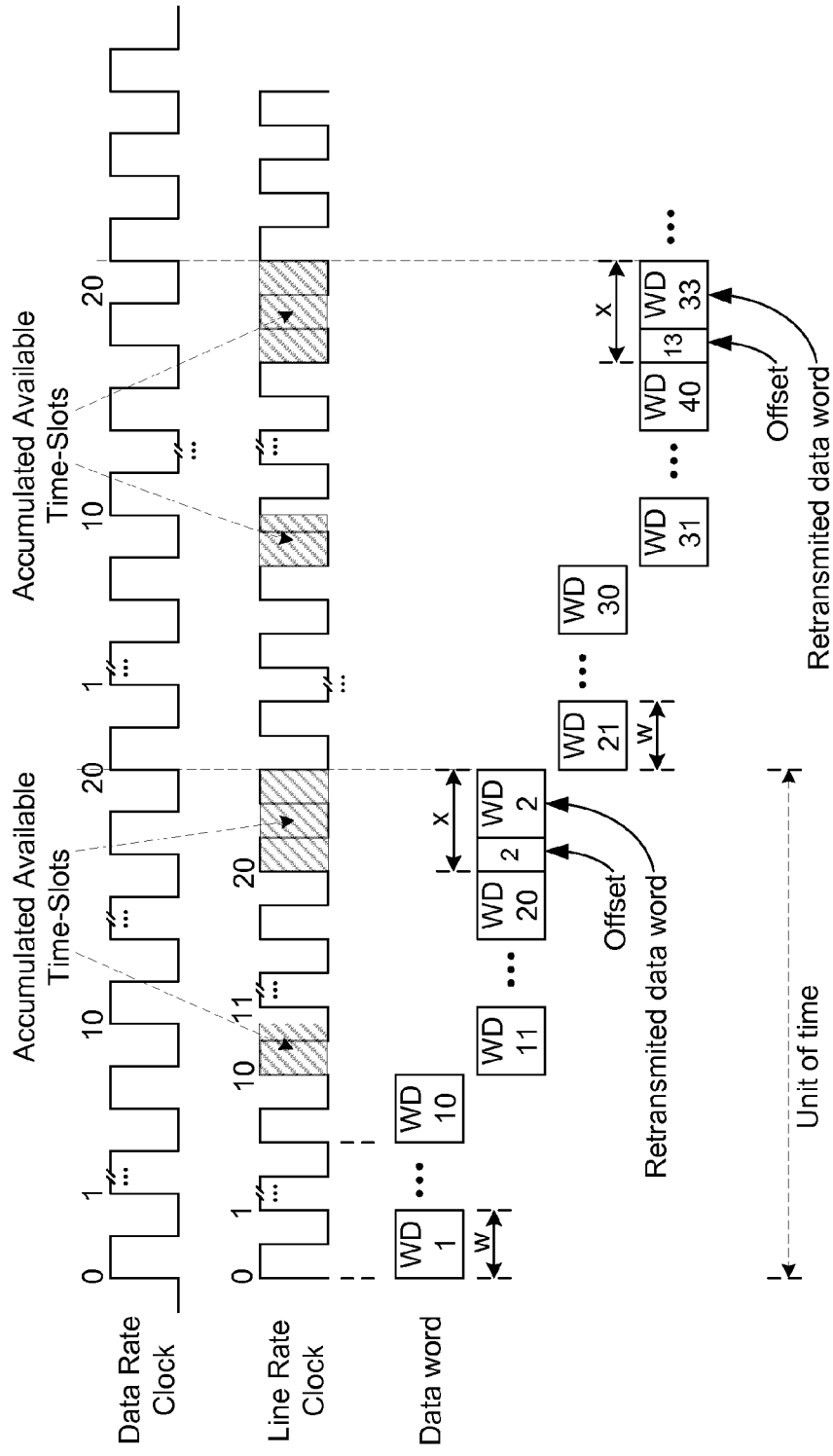
FIG. 5 illustrates an exemplary timing relationship of signals and the transmission and retransmission of data words in the data transfer systems of FIGS. 1 and 3 in accordance with some embodiments.

FIG. 5 illustrates an exemplary timing relationship of signals and the transmission and retransmission of data words in the data transfer systems 100 and 150 of FIGS. 1 and 3. In this example, "w" is the number of clock cycles of the Line Rate Clock needed to transmit one data word (e.g., 64 bits), and each "time slot" or "accumulated available time slot" has a duration of w clock cycles of the Line Rate Clock. In the example shown in FIG. 5, the delivered data rate is twenty (20) words per time unit and the line rate is 21.5 words per time unit, which is 1.5 words per time unit higher than the data rate. In this example, a "time unit" is the amount of time required to accumulate enough time slots to be able to retransmit one data word and an offset value that identifies the retransmitted data word. A time unit is shown as being equal to twenty clock cycles of the Data Rate Clock (Clk 113, FIGS. 1 and 3), which is equal to 21.5×w clock cycles of the Line Rate Clock (Clk 109, FIGS. 1 and 3). As an example, when a data word is 64 bits long and a simple 1 GHz serial data channel is used for transmission, the time unit is 1376 ns. It is noted that the clock signals shown in FIG. 5 are highly schematic or simplified representations of the clock signals. For example, if double rate serial data transmission is used, each "clock cycle" of the Line Rate Clock shown in FIG. 5 represents thirty-two (32) clock cycles of the actual Line Rate Clock signal; if single rate serial data transmission is used, each "clock cycle" of the Line Rate Clock shown in FIG. 5 represents sixty-four (64) clock cycles of the actual Line Rate Clock signal. The numerical examples at the bottom of FIG. 5 are based on a 1 GHz Line Rate Clock, and single rate serial data transmission.

As described above in relation to FIG. 1, the higher line rate allows additional time slots to be accumulated and a data word to be retransmitted so as to improve the BER of the entire data transfer system. The difference between the Data Rate Clock and the Line Rate Clock are the Accumulated Available time slots and are shown in FIG. 5 as the shaded area on the Data Rate Clock and the Line Rate Clock. When a predefined amount or number of Accumulated Available time slots is equal to at least a predefined amount, a selected data word is retransmitted. In some embodiments, the predefined amount is the time required to transmit the data word (w). In other embodiments and in the example shown in FIG. 5, the predefined amount is the time required to transmit a data word plus an offset parameter. As noted above, "w" is the number of clock cycles of the Line Rate Clock needed to transmit one data word (e.g., 64 bits). The time required to transmit the offset parameter is half as many clock cycles of the Line Rate Clock, and thus, the predefined amount is equal to 1.5×w clock cycles of the Line Rate Clock.

The offset parameter is a relative address that identifies the selected data word that is being retransmitted. For example, if after sending a group of twenty data words the retransmit control logic 128 or 168 can select any of the last one-hundred (100) data words that have been transmitted, then the offset parameter identifies which of the one-hundred (100) last data words is being retransmitted. In this example, the offset parameter is thirty-two (32) bits long (half the length of a data word, which is 64 bits long), but only seven (7) bits of the offset parameter are needed to identify which of the last hundred data words are being retransmitted. In another example, fewer bits (e.g., the minimum number of bits required to uniquely identify the data word(s) to be retransmitted) are used. In yet another example, additional bits are included in the retransmitted data words in embodiments in which the data words to be retransmitted are encoded with error correction codes. In some embodiments, the retransmit control logic 128 or 168 may select a data word for retransmission only from among the words transmitted since the last time a word was retransmitted, while in other embodiments the retransmit control logic 128 or 168 may select a data word for retransmission from a larger set of the most recently transmitted data words.

As shown in FIG. 5, data words 1 through 10 (WD 1 . . . WD 10) are transmitted in 10×w clock cycles of the Line Rate Clock (which is approximately 9.25×w clock cycles of the Data Rate Clock). Therefore, at this point, there are almost 0.75 Accumulated Available time slots, which is almost 0.75×w clock cycles of the Line Rate Clock. (More precisely, in this example, after 10.75×w clock cycles of the Line Rate Clock, there are 0.75 Accumulated Available time slots.) Data words 11 through 20 (WD 11 . . . WD 20) are transmitted in another ten clock cycles of the Line Rate clock (approximately another 9.25×w clock cycles of the Data Rate Clock). After transmitting twenty data words, the number of Accumulated Available time slots is almost (but not yet) 1.5. In this example, after 21.5×w clock cycles of the Line Rate Clock, Clk 109, exactly 1.5 time slots have been accumulated as available time slots. Accordingly, during each time period of 21.5×w clock cycles of the Line Rate Clock, Clk, twenty (20) data words are transmitted and 1.5 available times slots are accumulated. Thus, during each such time period a single data word may then be retransmitted, along with an offset value. In this example, the retransmitted data word is data word 2 (WD 2) and the offset is the address (2) for data word 2. Typically, the offset is an address or offset relative to a predefined starting point, such as the earliest word that is still eligible for being retransmitted or any other appropriate starting point.

The example continues with the transmission of data words 21 through 40 (WD 21 . . . WD 40) in another 20×w clock cycles of the Line Rate Clock. Thus, at this time, the number of Accumulated Available time slots is almost 1.5 clock cycles of the Line Rate Clock. After another 1.5 clock cycles of the Line Rate Clock, the number of Accumulated Available time slots (1.5) is equal to the predefined amount and another data word may be retransmitted. In this example, the second retransmitted data word is data word 33 (WD 33) and the offset is the address for data word 33 (13) relative to a predefined starting point (e.g., word 21).

As explained above, a selected data word is retransmitted when enough available time slots have been accumulated that the retransmitted data word(s) occupy no more than the available time slots. However, it may be noted that the determination of when the number of accumulated available time slots is sufficient depends on when the retransmission control logic starts "counting" or accumulating available time slots. In addition, it is noted that for a given value of delta, the number of data words transmitted before the accumulated available time slot reaches the threshold may be a fixed number (e.g., twenty) in at least some embodiments. However, in other embodiments the number of data words transmitted before the accumulated available time slots reaches the threshold may vary (e.g., between two values, N and N+1) even while the value of delta remains constant. In any case, the transmitting device 110, 160 cannot wait for arbitrarily long periods of times between data retransmission operations, because the potential retransmission words must be stored in the output buffer FIFO 115 (FIG. 1 or 3), or other memory 121 (FIG. 4), and any such storage device will have limited storage.

In alternate embodiments, two or more data words may be retransmitted each time the number of accumulated available time slots reaches or exceeds a threshold value. This methodology is useful in systems in which transmission errors tend to occur in bursts. Even if error bursts rarely occur, the ability to predict and compensate for such error bursts may substantially increase the reliability of the communication channel and substantially reduce its effective BER. In the context of FIG. 5, but in a system in which two data words are retransmitted each time the number of accumulated available time slots reaches or exceeds the threshold value (e.g., a threshold of three time slots), one or two offset values and two data words are transmitted after forty (40) or so data words are transmitted. In some embodiments, the retransmitted two data words are always adjacent to each other in the sequence of previously transmitted data words, and therefore only one offset is needed to identify (for example) the first of the two data words. In other embodiments, two offset values are sent along with the two retransmitted data words.

In another embodiment, in which three data words are retransmitted each time the number of accumulated available time slots reaches or exceeds a threshold value (e.g., four time slots), one data word is selected by the data analyzer 126 or retransmit control logic 128 for retransmission, and the preceding and following data words (if their values are known) are retransmitted along with the selected data word, in order to compensate for possible error bursts in the transmitted data stream. If the error burst occurs, or is predicted to have occurred, at the end of the transmitted data stream, the data word following the selected data word may not have been transmitted yet, in which case that data word may nevertheless be "retransmitted" if it is present in the memory element 120. Alternately, in this situation the third data word of the "retransmitted" data words may be replaced with null data or the original data word may be transmitted multiple times, with scrambling, re-ordering, or in it's original form.

Figure 6A:
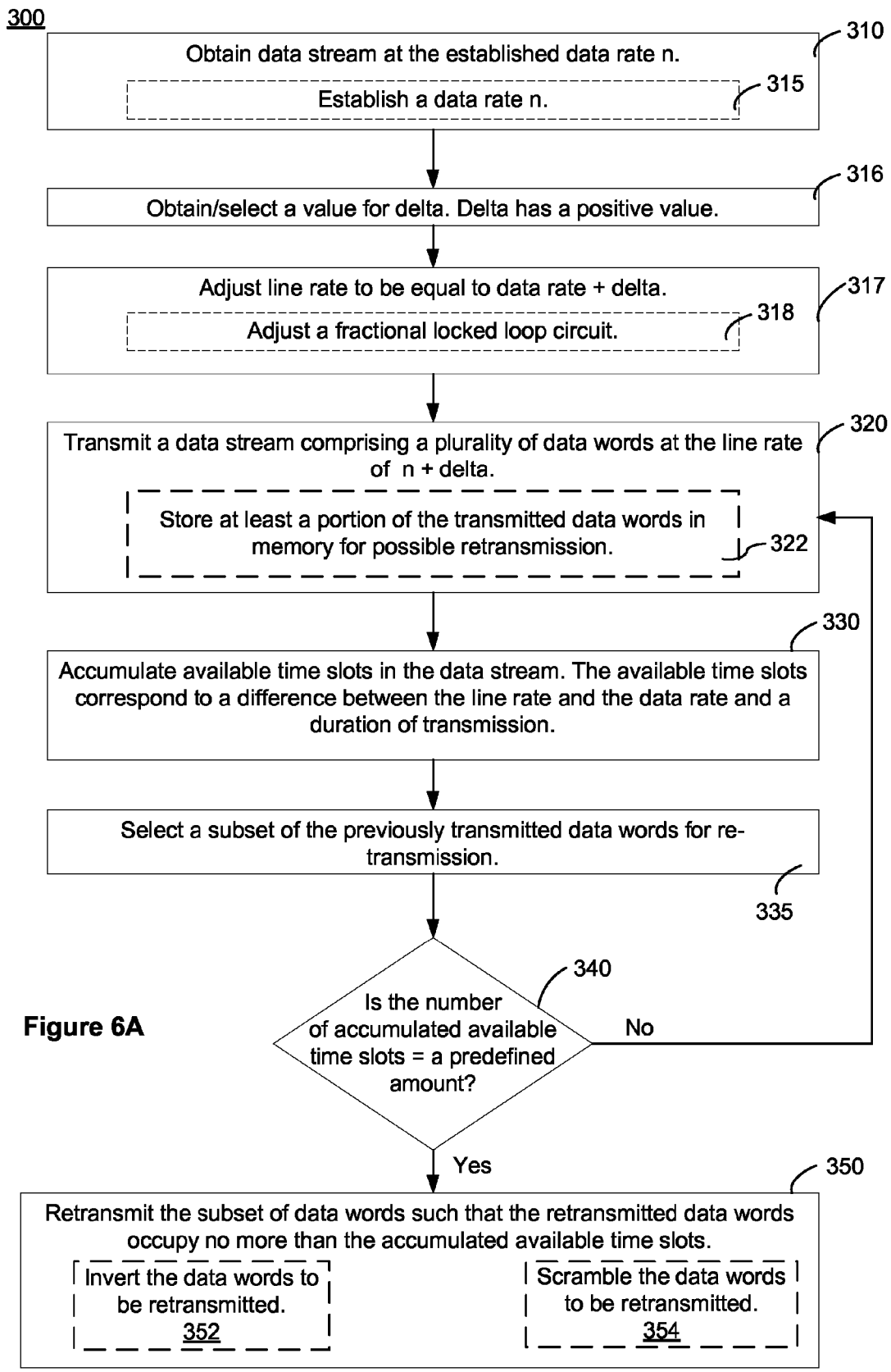
FIGS. 6A-6C are flow diagrams illustrating a process for reducing bit-error rate in a data transmitter in accordance with some embodiments.
Figure 6B:
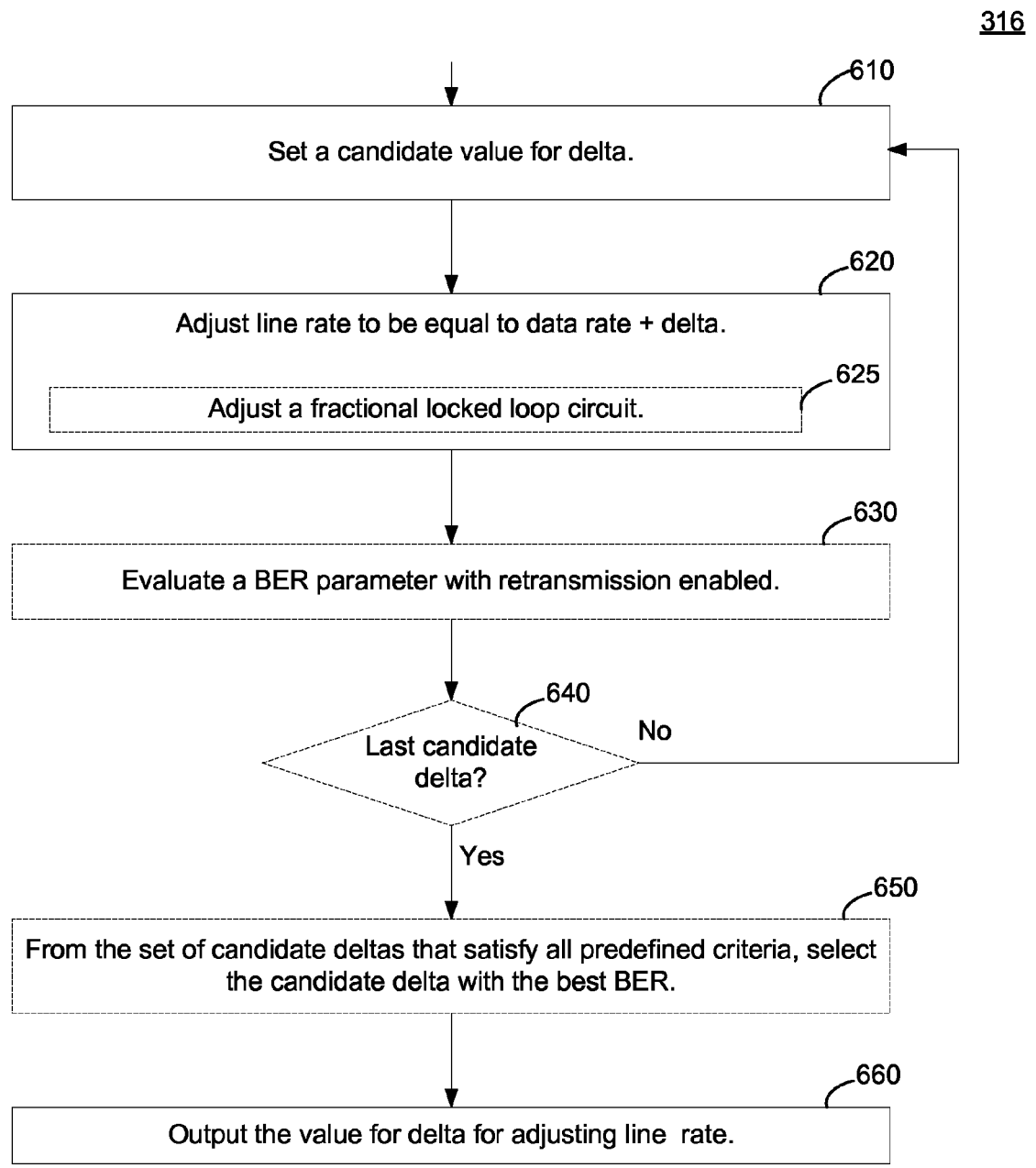
Figure 6C:
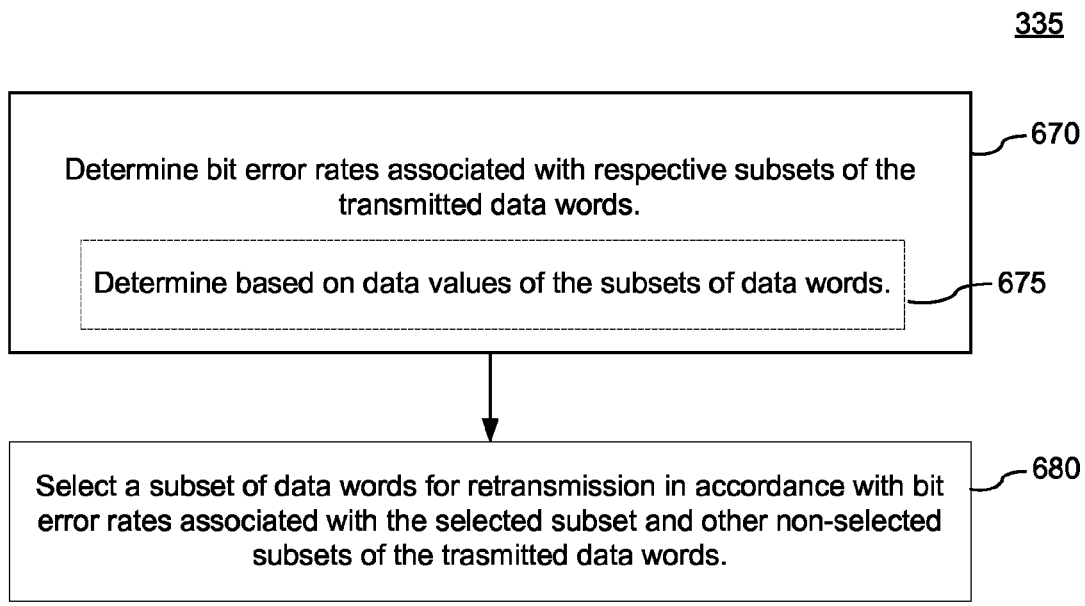

FIGS. 6A-6C are flow diagrams illustrating a process 300 for reducing BER in a communication channel in accordance with some embodiments. Optional steps are shown using dashed lines. In some embodiments, process 300 is performed at the transmitting side, such as, by using any one of transmitting devices 110, 160 and 110A.

As shown in FIG. 6A, the process 300 includes obtaining a data stream at an established data rate "n" for transmission to a receiving side (310). In some embodiments, the process 300 optionally includes establishing the data rate "n", at 315. In other embodiments, the data rate "n" is established by another entity, such as by a source of the data stream.

The process 300 includes obtaining a value for delta, at 316. The delta value is a positive value used to change the line rate of a data communication system, such as data communication system 100, 150 or 100A. In some embodiments, a delta value is obtained by performing a calibration operation, which is discussed further in reference to FIG. 6B. In some embodiments the value of delta is fixed, either at startup or fixed for a given system design.

The process 300 includes adjusting the line rate of the data communication system to be equal to "n"+delta, where delta has a positive value, at 317. In some embodiments, the line rate is adjusted by adjusting a fractional locked loop circuit, such as circuit 113, at 318.

The process 300 includes transmitting, such as by using transmitter 118 or 118A, a data stream comprising a plurality of data words at a line rate of:

$$n+delta$$

at 320, where delta is the positive value obtained or selected at 316. In some embodiments, the transmitted data words are stored in memory such as memory 121, or in a buffer such as FIFO 115, for possible retransmission, at 322.

Because the line rate is greater than the data rate (by the selected delta value), time slots in the data stream become available. Available time slots in the data stream are repeatedly accumulated, at 330. The available time slots are accumulated at rate corresponding to a difference between the line rate and the established data rate. In some embodiments, the accumulated available time slots correspond to the difference between the line rate and the data rate multiplied by the number of data cycles for which the difference has been allowed to accumulate.

The process 300 further includes selecting a subset of the previously transmitted data words for retransmission, at 335. In some embodiments, the subset is selected based on predictions of which previously transmitted data words were most likely to be corrupt or transmitted with error. An embodiment of selecting the subset of the previously transmitted data words for retransmission is discussed further in reference to FIG. 6C. In some embodiments, the data words to be retransmitted are selected (335) after the number of accumulated available slots equals a predefined about (see discussion below).

The process 300 further includes determining if the number of accumulated available time slots equals a predefined amount, at 340. If the number of accumulated available time slots does not equal a predefined amount (340-No), then the process continues to transmit the data stream, at 320, and accumulate available time slots, at 330. Otherwise, if the number of accumulated available time slots equals the predefined amount (340-Yes), the process 300 proceeds to retransmit the subset of previously transmitted data words, at 350. In some embodiments, the predefined amount is at least the minimum number of available time slots required to transmit the one or more data words. In other embodiments, the predefined amount is at least the minimum number of available time slots required to transmit the one or more data words and an offset parameter. As described above with respect to FIG. 2, the offset parameter may comprise a relative address that identifies the selected data word that is being retransmitted. In some embodiments, the number of accumulated available time slots equals to at least the predefined amount each time the transmitting operation (320) transmits a particular number of words.

The process 300 further includes selectively retransmitting the selected subset of the plurality of data words such that the retransmitted data words occupy no more than the accumulated available time slots (350). In some embodiments, the retransmitted data words are transmitted between groups of transmitted data words at fixed intervals. The fixed intervals are a predefined function of the line rate and delta. The retransmitted data words may be inverted, at 352 or reordered or scrambled, at 354.

FIG. 6B illustrates an embodiment of a process 316 for selecting a value for delta. In some embodiments, the process 316 is performed by transmit calibration logic 152 and receive calibration logic 154 (FIG. 3). The process 316 may include performing a calibration operation to determine delta. The calibration operation includes determining a BER parameter for each of a plurality of candidate delta values and selecting one of the candidate delta values in accordance with predefined criteria. In some embodiments, the predefined criteria includes a desired BER. For example, the predefined criteria may be to select "the candidate delta that is associated with the highest line rate that is (A) no more than 10 percent above the data rate, and (B) which has a BER no higher than $10^{-15}$."

The process 316 includes selecting a candidate value for delta, at 610, and adjusting the line rate of the data communication system, such as system 100, 150 or 100A, to be equal to the data rate "n"+ the selected candidate value of delta, at 620. In some embodiments, adjusting the line rate optionally includes adjusting a fractional frequency locked loop circuit, such as circuit 105 or 105A, at 625.

The process 316 includes evaluating a BER parameter for the selected candidate delta value with retransmission enabled, at 630. As described above with respect to FIG. 3, the BER parameter may include one or more of: a measured BER, a voltage margin, a measured voltage margin to a measured BER, a timing margin, or a predefined combination of these. If any additional candidate delta values remain (640-No), operations 610-630 are repeated until all candidate delta values have been evaluated (640-Yes). Then, after excluding any delta values that do not satisfy all relevant (predefined) criteria, the candidate delta value having the best BER (or best BER parameter(s)) is selected, at 650, and that delta value is output for adjusting the line rate, at 660.

In some embodiments, the calibration process may be repeated from time to time (e.g., periodically, or episodically in response to a signal or a detected condition, such as a change in temperature) in order to output a delta value for adjusting the line rate.

FIG. 6C illustrates a process 335 for selecting a subset of the transmitted plurality of data words for retransmission. The selected subset comprises one or more data words of the transmitted data words. In some embodiments, process 335 is performed by retransmit control logic, such as retransmit control logic 128, 168 or 128A, possibly in conjunction with Analyzer 126 or 126A. In some embodiments, process 335 includes selecting the subset of data words for retransmission in accordance with BERs associated with the selected subset of the transmitted data words and other non-selected subsets of the transmitted data words.

In some embodiments, process 335 includes determining BERs or BER parameters associated with subsets of the transmitted data words, or possible indicators of BER or BER parameters, at 670. In some embodiments, the BERs associated with respective subsets of the transmitted data words are optionally determined based on data values of (or embedded within) the subsets of data words, at 675. Process 335 includes selecting a subset of the transmitted data words for retransmission in accordance with the determined BERs or BER parameters associated with the selected subset of the transmitted data words, at 670. For example, a subset of the transmitted data words having worse BER parameters than other subsets may be selected for retransmission.

Figure 7:
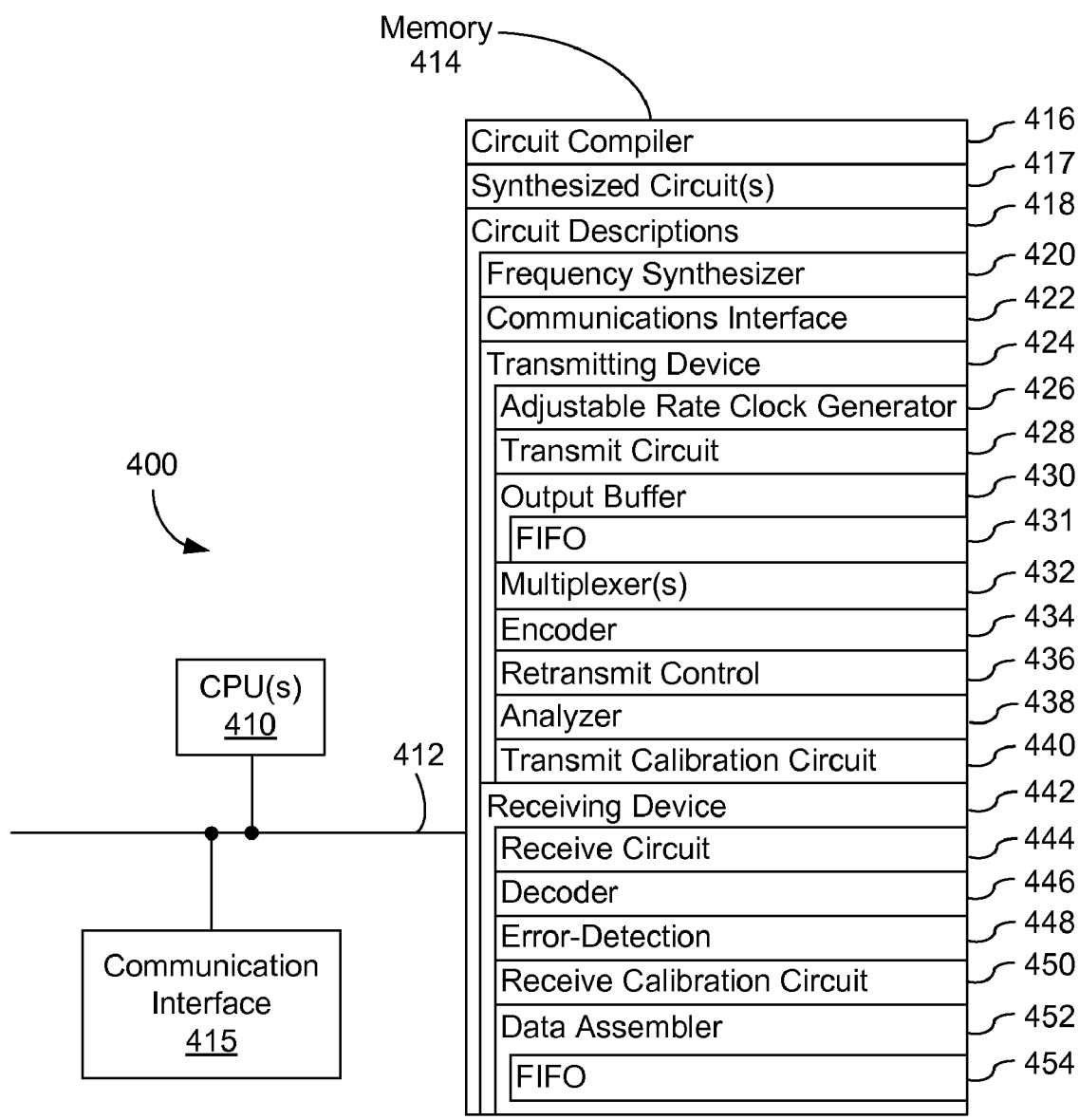
FIG. 7 is a block diagram illustrating an embodiment of a system for storing computer readable files containing software descriptions of circuits for implementing a data transmitter with error prediction in accordance with some embodiments.

FIG. 7 is a block diagram illustrating an embodiment of a system 400 for storing computer readable files containing software descriptions of the circuits. The system 400 may include: one or more data processors or central processing units (CPU) 410; memory 414; one or more communication interfaces 415 for connecting the system 100 to other devices, computers or systems; and one or more signal lines or communication busses 412 for coupling these components to one another. The communication buses 412 may include circuitry (sometimes called a chipset) that interconnects and controls communications between system components. Memory 414 may include: high-speed random access memory, such as DRAM, SRAM, DDR RAM, MRAM or other random access solid state memory devices; and/or non-volatile memory, such as one or more magnetic disk storage devices, optical disk storage devices, flash memory devices, or other non-volatile solid state storage devices. Memory 414 may optionally include one or more storage devices remotely located from the CPU(s) 410.

Memory 416, or alternately the non-volatile memory device(s) within memory 416, comprises a computer readable storage medium. In some embodiments, the computer readable storage medium of memory 416 stores in one or more of the previously mentioned memory devices one or more circuit compilers 416 and one or more circuit descriptions 418. The circuit compiler 416, when executed by a processor such as CPU 410, processes the one or more circuit descriptions 418 to synthesize one or more corresponding circuits (synthesized circuits 417).

Circuit descriptions 418 may include circuit descriptions for the circuits, or a subset of the circuits discussed above with respect to FIGS. 1, 3 and 4. In particular, circuit descriptions 418 may include circuit descriptions of one or more frequency synthesizers 420, a communications interface 422, a transmitting device 424, and a receiving device 442. Alternately, the circuit descriptions 418 may include descriptions of a subset of the aforementioned circuits (e.g., the transmitting device 424, but not the receiving device 424; or the descriptions of the transmitting device 424 and the receiving device 442, but not the other circuits), and may optionally include descriptions of additional circuits.

The circuit descriptions for the transmitting device 424 may include circuit descriptions of an adjustable rate clock generator 426, a transmit circuit 428, an output buffer 430, one or more multiplexers 432, an encoder 434, retransmit control 436, a data analyzer 438, and a transmit calibration circuit 440. The circuit description for the output buffer 430 may include circuit descriptions of a first-in-first-out circuit (FIFO) 431. Alternately, the circuit descriptions for the transmitting device 424 may include descriptions of a subset of the aforementioned circuits, and may optionally include descriptions of additional circuits.

The circuit descriptions for the receiving device 442 may include circuit descriptions of a receive circuit 444, a decoder 446, error-detection 448, a receive calibration circuit 450, a data assembler circuit 452 which may optionally include a FIFO 454. Alternately, the circuit descriptions for the receiving device 442 may include descriptions of a subset of the aforementioned circuits, and may optionally include descriptions of additional circuits.

The foregoing description, for purposes of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of reducing bit-error rate, comprising:
at a sending device,
transmitting, to a receiving device, a data stream comprising data words at a line rate, the line rate equal to a positive delta value added to an established data rate;
accumulating available time slots in the transmitted data stream; and
selectively retransmitting in the data stream, to the receiving device, a subset of the data words such that the retransmitted data words occupy no more than the available time slots.

2. The method of claim 1, wherein the subset is selected at the sending device independent of the receiving device.

3. The method of claim 2, wherein the subset is selected in accordance with bit-error rates associated with the data words in the data stream.

4. The method of claim 3, wherein the bit-error rates are determined based on data values of the data words.

5. The method of claim 1, wherein a number of the available time slots is a function of the delta value.

6. The method of claim 5, wherein the number of the available time slots is a function of a duration of transmission to the receiving device.

7. The method of claim 1, wherein the subset is transmitted when a number of the accumulated available time slots equals at least a predefined amount, wherein the subset comprises one or more data words.

8. The method of claim 7, wherein the predefined amount is at least a minimum number of available time slots that is required to transmit the one or more data words.

9. The method of claim 7, wherein the predefined amount is at least a minimum number of available time slots that is required to transmit the one or more data words and an offset parameter.

10. The method of claim 7, wherein the number of accumulated available time slots is equal to at least the predefined amount each time the transmitting operation transmits a particular number of data words.

11. The method of claim 1, wherein the subset is transmitted at fixed intervals that occur between transmissions of groups of the data words in the data stream.

12. The method of claim 11, wherein the fixed intervals are a predefined function of the line rate and the delta value.

13. The method of claim 1, wherein the data words of the retransmitted subset are inverted relative to corresponding data words in the data stream.

14. The method of claim 1, wherein the data words of the retransmitted subset are reordered or scrambled relative to corresponding data words in the data stream.

15. The method of claim 1, further comprising:
performing a calibration operation to determine the delta value, including determining a bit-error rate parameter for each of a plurality of candidate delta values and selecting one of the candidate delta values in accordance with predefined criteria.

16. The method of claim 15, including performing the calibration operation multiple times to accumulate a plurality of distinct candidate delta values.

17. The method of claim 15, including:
adjusting a fractional locked loop circuit to adjust the line rate by a plurality of distinct values, each distinct value corresponding to one of the candidate delta values.

18. The method of claim 1, further comprising:
adjusting the line rate, including using a fractional locked loop circuit to adjust a reference rate by a plurality of distinct values.

19. The method of claim 1, further including:
storing at least a portion of the data words in the data stream for possible retransmission as the subset.

20. The method of claim 1, further including:
obtaining the data words at the established data rate;
wherein the transmitting transmits the data words at an average rate equal to the established data rate.

21. A data transmitter, comprising:
a transmitter that transmits a data stream comprising data words at a line rate, the line rate equal to a positive delta value added to an established data rate; and
retransmit logic coupled to the transmitter, the retransmit logic including an accumulator that accumulates available time slots in the transmitted data stream;
wherein the transmitter, in conjunction with the retransmit logic, selectively retransmits a subset of the data words such that the retransmitted data words occupy no more than the available time slots.

22. A mechanism, comprising:
a first means for transmitting a data stream comprising data words at a line rate, the line rate equal to a positive delta value added to an established data rate; and
a second means coupled to the first means, the second means for accumulating available time slots in the transmitted data stream;
wherein the first means, in conjunction with the second means, selectively retransmits a subset of the data words such that the retransmitted data words occupy no more than the available time slots.

23. A non-transitory computer readable storage medium storing data representing a circuit that includes:
a transmitter that transmits a data stream comprising data words at a line rate, the line rate equal to a positive delta value added to an established data rate; and
retransmit logic coupled to the transmitter, the retransmit logic including an accumulator that accumulates available time slots in the transmitted data stream;
wherein the transmitter, in conjunction with the retransmit logic, selectively retransmits a subset of the data words such that the retransmitted data words occupy no more than the available time slots.

* * * * *